June 12, 1923.  1,458,727

F. V. ROSENBROOK

COMBINED FENDER AND SPARE TIRE HOLDER FOR VEHICLES

Filed April 17, 1922

WITNESS:
C. L. Osgood

INVENTOR.
F. V. Rosenbrook
BY
H. J. Sanders
ATTORNEY.

Patented June 12, 1923.

1,458,727

UNITED STATES PATENT OFFICE.

FREDDIE VERNETT ROSENBROOK, OF CHICAGO, ILLINOIS.

COMBINED FENDER AND SPARE-TIRE HOLDER FOR VEHICLES.

Application filed April 17, 1922. Serial No. 554,032.

*To all whom it may concern:*

Be it known that I, FREDDIE V. ROSENBROOK, a citizen of the United States, residing at Chicago, in the county of Cook and State of Illinois, have invented certain new and useful Improvements in Combined Fenders and Spare-Tire Holders for Vehicles, of which the following is a specification.

This invention relates to improvements in combined fenders and spare tire holders for automobiles and its object is to provide a device of this type that is simple in construction and efficient in operation. With the foregoing and other objects in view the invention consists in the combination and arrangement of parts to be hereinafter fully described, pointed out in the appended claim and illustrated in the accompanying drawing which forms a part of this application and in which—

Like reference characters denote corresponding parts throughout the several views.

Figure 1:
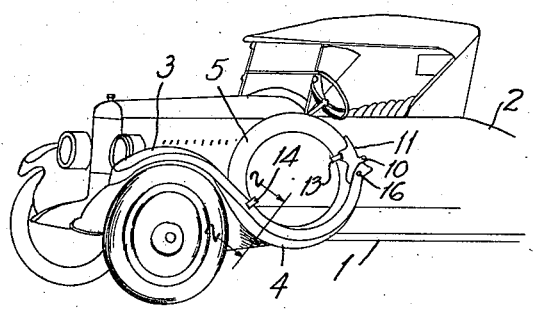
Fig. 1 is a fragmentary view of an automobile provided with my combined fender and spare tire holder.
Figure 4:
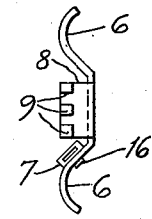
Fig. 4 is a plan view of the end of the device with the head removed.
Figure 2:
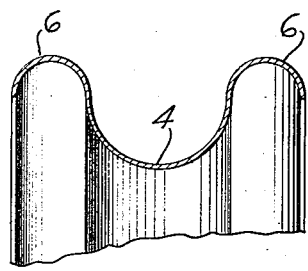
Fig. 2 is an enlarged fragmentary sectional view taken on line 2—2 of Fig. 1.

In applying my fender and spare tire holder I remove the ordinary fender from the automobile and substitute mine, securing it to the running board 1 and to the chassis of the vehicle 2. The device comprises the curved metal body portion comprising the shield 3, disposed over a front wheel of the vehicle, and the longitudinally and centrally channeled portion 4 which is adapted to carry the spare tire 5, the said channeled portion 4 being flanked upon its sides by the curved wings 6, a spring lock casing 7 being carried by one of the said wings at one of its ends.

Figure 3:
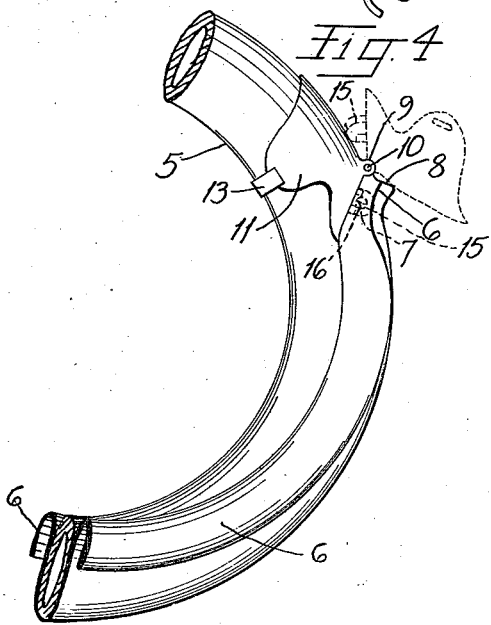
Fig. 3 is an enlarged fragmentary view of the device.

The channeled portion 4 is formed with an upturned end 8 formed with the aligned perforated ears 9 that receive the pintle 10 whereby the head 11 is hinged to said end 8, the hinged end of said head being adapted to rest upon the adjacent end of the channeled portion 4, said head being of a shape to conform to the periphery of the tire 5 and being provided with a strap 13 whereby the tire may be secured to the head. Another strap 14 is carried by the wings 6 and is used, also, to secure the tire in place in the carrier. The head 11 is provided with the hasp 15 adapted, when the head is disposed upon the end of the channeled portion 4, to snap into locking engagement with the lock casing 7 thereby securing the head and body against relative movement. By means of a key inserted in the keyway 16, of one wing 6, the spring lock may be opened and the head 11 raised to the position shown dotted in Fig. 3 after the strap 13 has had one of its ends disengaged from the head; when the strap 14 is similarly disengaged at one end from a wing 6 the tire may be removed.

What is claimed is:—

In a combined fender and spare tire holder for vehicles, a channeled body member forming a shield at one end, the opposite end of said body member being upturned, a head hinged to the upturned end of said body member and in one position being adapted to rest thereupon and to form, in effect, a continuation thereof, a strap carried by said body member, a strap carried by said head, and means for locking said head and body member together in their aligned positions.

In testimony that I claim the foregoing as my own I have hereto affixed my signature in the presence of two subscribing witnesses.

FREDDIE VERNETT ROSENBROOK.

Witnesses:
JOHN N. BRACKMAN,
LEO FRISHLER.